United States Patent [19]

Cárdenas-Franco

[11] 4,108,623
[45] Aug. 22, 1978

[54] ELECTRONIC CONTROL SYSTEM FOR GLASSWARE AND OTHER THERMOPLASTIC ARTICLES FORMING MACHINES

[75] Inventor: Luis Cárdenas-Franco, Monterrey, N. L., Mexico

[73] Assignee: Investigacion Fic Fideicomiso, Monterrey, N.L., Mexico

[21] Appl. No.: 843,200

[22] Filed: Oct. 18, 1977

[30] Foreign Application Priority Data

Jun. 6, 1977 [MX] Mexico ................................. 169360

[51] Int. Cl.² .............................................. C03B 9/40
[52] U.S. Cl. .......................................... 65/163; 65/29;
 65/158; 65/159; 65/164; 65/DIG. 13; 364/473
[58] Field of Search ................. 65/160, 163, 164, 158,
 65/159, DIG. 13, 29; 364/473, 476

[56] References Cited

U.S. PATENT DOCUMENTS

| 3,762,907 | 10/1973 | Quinn et al. ............................ 65/164 |
| 3,877,915 | 4/1975 | Mylchreest et al. ...................... 65/29 |
| 3,905,793 | 9/1975 | Croughwell ......................... 65/164 X |
| 4,007,028 | 2/1977 | Bublitz et al. ............................ 65/163 |

*Primary Examiner*—Arthur D. Kellogg
*Attorney, Agent, or Firm*—Sughrue, Rothwell, Mion, Zinn and Macpeak

[57] ABSTRACT

An electronic timing control system for glassware and other thermoplastic articles forming machines of the kind having a plurality of unitary forming sections and a single molten glass gob feeding and distribution means, each forming section comprising glass gob guiding channels, a blank forming station, a blow molding station and/or a take out station, and finished ware take out means, comprises a preprogrammed controller capable of sequentially controlling all the ware forming operations, a constant frequency pulse generator to operate as a real time clock to measure the timing and duration of each operation sequentially controlled by said controller, a glass gob release sensor to detect the instant when a glass gob is cut and released from said glass gob feeding and distribution means and feed back a signal to said controller to indicate the end of a prior cycle and the initiation of a new cycle of operations, a temperature sensor to detect the passage of a glass gob from said guiding channels into said blank forming station and feed back a signal to said controller to trigger the operation of the parison forming means, and a pressure sensor to detect the instant when said parison forming means commence to work on a glass gob and feed back a signal in accordance with the pressure to said controller to initiate the time count and to thereby secure an accurate duration of the parison forming operation, said controller also having mode of operation selector switches to enable selection of manual operation of the different main mechanisms of the machine without the need of inhibiting the remaining mechanisms, unloaded test operation of the machine to sequentially work the mechanisms without a load of glass, and fully automatic operation with a load of glass, and a variable frequency oscillator to simulate the signal of the gob release sensor, whereby when the unloaded test operation is selected, the simulated time signals are given by said oscillator and by the operator, whereas when automatic operation is selected, the real time signals are back fed to the controller by said sensors.

15 Claims, 6 Drawing Figures

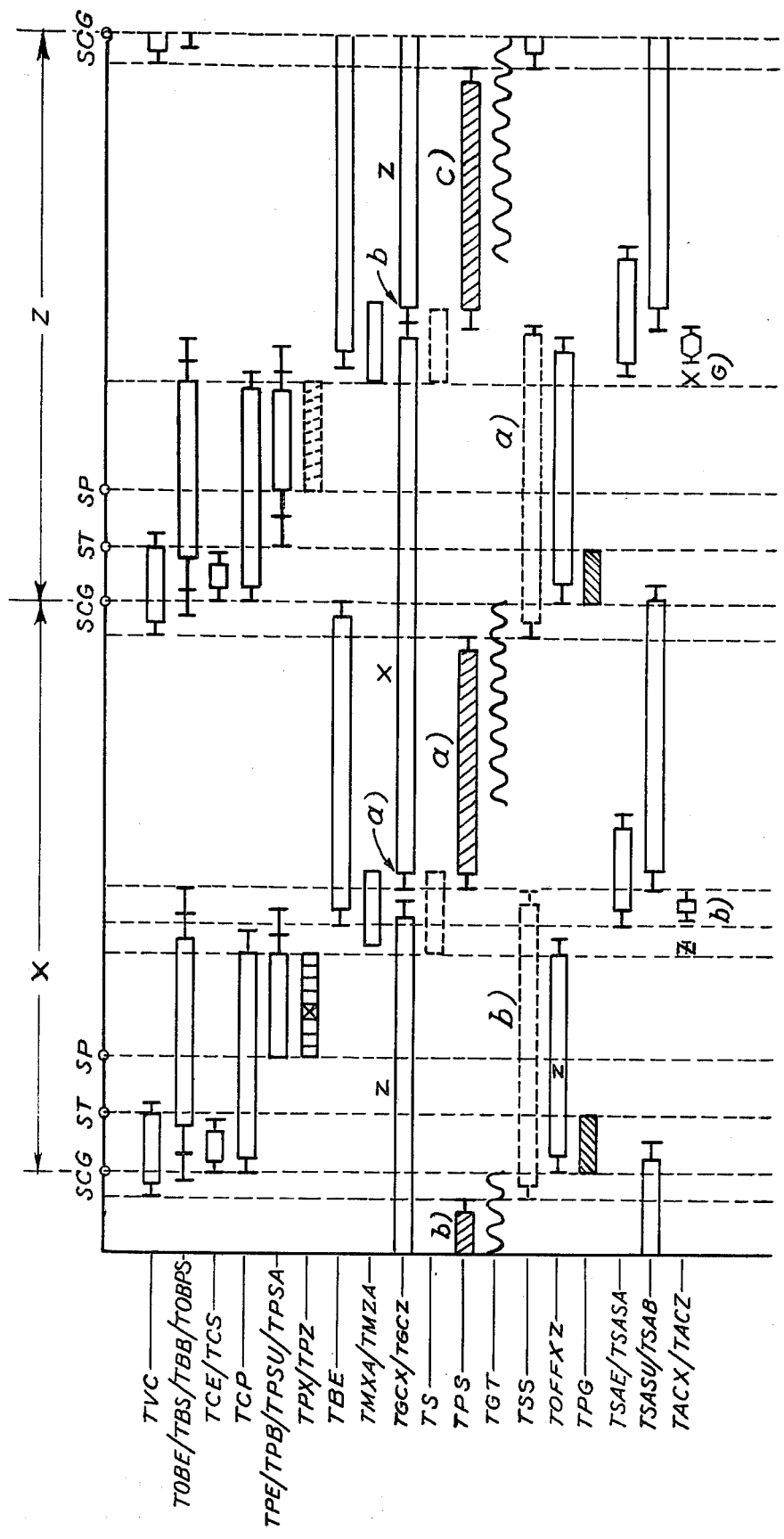

ELECTRONIC CONTROL SYSTEM FOR GLASSWARE AND OTHER THERMOPLASTIC ARTICLES FORMING MACHINES

FIELD OF THE INVENTION

The present invention refers to electronic control systems for glassware and other thermoplastic articles forming machines and, more particularly, it is related to electronic timing control systems for glassware forming machines which provide a real time operation of the ware forming cycle of the machine without the need of counting degrees of a circumference, and which provide for back feeding of signals to mark the timing and duration of critical operations, whereby said electronic control systems are capable of individually regulating the timing and duration of both absolute and relative variables of the ware forming cycle.

BACKGROUND OF THE INVENTION

Manufacture of hollow glass or other thermoplastic articles is a very ancient and well known art. The necessity of modern mass production of certain glass articles, caused the advent of the modern automated glassware forming machines, which have acquired extended preference to carry out the normal procedure to form glassware, in contrast to the slower and quite less efficient process of forming such articles by hand. In broad terms, however, all the modern mass production machines require to carry out a rather large and intricate plurality of sequential operations in order to form glassware from a continuous supply of molten glass gobs, whereby they require a suitable timer device to sequentially and timely carry out the said operations in the machine.

Broadly speaking, a process of machine forming hollow glass articles comprises sequentially feeding glass gobs to a plurality of forming sections of the machine, and sequentially controlling the performance of each individual forming section of the machine in order to carry out the following operations: Glass gobs from the gob generating means are conducted by means of scoops which are alternately placed under the glass gob source and deliver the gobs to a set of feeding channels leading the gobs to the interior of blank forms located at a blank forming station; thereafter respective parisons are formed within said blank molds by means of an operation selected from a pressing operation by working pistons into and out of the blank forms, and a blowing operation by working a baffle and thereafter counter-blowing the gob through the bottom of said blank mold. Once the parison has been formed in the blank mold, the latter is removed from the blank forming station in order to release the parison formed and a reheat and stretch period of the parison is permitted in order to increase the temperature of the cooled surfaces of the parison at the expense of the heat preserved in the interior of the body of said parison until the parison is at a uniform temperature. During this operation and thereafter, the parison remains supported by means of a neck ring which may at the same time be a mold for forming the neck of the finished article. Thereafter, a pair of open blow mold halves are closed around the thus formed and reheated parison either at the blank forming station or by firstly transferring and inverting the parison from the blank molding station to the blow molding station, depending on the type of machine utilized, and the blowing of the article is commenced in order to finish the ware.

Once the parison or the split blow mold containing it is removed from the blank molding station and transferred to a second station which may be a blow molding station or a take out station, the blank molding station is left free to commence operation again by returning the blank mold into position to receive a second glass gob and meanwhile the finished article is removed by opening the blow mold halves and placing in the appropriate position a take out mechanism, whereafter the neck ring is opened to deposit the article onto said take out mechanism which takes the finished ware out of the machine by means of a conveyor or the like.

Additional operations may be necessary for each forming section of the machine if the same operates on the paste mold process, inasmuch as in this particular instance, once the blow mold halves close around the parison, the neck ring commences rotation in order to blow and rotate the parison until the finished ware is completed. Also, cooling of the blow mold halves which are not in operation becomes necessary in order to reduce their temperature which is generally raised by the hot parison and, therefore, showers to spray a cooling liquid are generally provided in this type of glassware forming machines, in order to spray said fluid on the interiors of the blow mold halves when the same are not in operation to blow an article therein, in order to attain appropriate cooling or humidification thereof, the latter being necessary when using the paste mold method and the former being necessary when using the hot mold method.

As it can be seen from the above, the rather intricate and accurately sequentially timed operations required for each of the forming sections to be performed, cannot be controlled by hand and, therefore, it has been customary up to recent times to provide a mechanical timer device in the machine, to work in conjunction with a plurality of cam operated valves each one handling an appropriate fluid to actuate fluid operated motors that in turn actuate every single mechanism of the machine. In other words, all modern machines are designed to have fluid operated mechanisms in order to be controlled by a set of valves which are in turn controlled by means of the mechanical timing device.

The most widely used mechanical timing device is the very well known mechanical timing drum comprising a rotary drum having a plurality of circumferential grooves on its surface, within which a corresponding plurality of cams are arranged in positions suitable to timely actuate cam followers associated with cam operated valves to sequentially and timingly operate all the mechanisms of the machine as stated above.

The prior art timing drum is generally rotatably driven in synchronism with the gob feeding means and with the take away conveyor for finished articles, thus resulting in a somewhat continuous flow of molten glass gobs into the machine and a corresponding flow of ware down the take away conveyor.

As the timing drum associated with a given section rotates, the several fluid operated forming means, including the aforementioned blank and blow molds and the elements associated therewith, are mechanically actuated in the required sequence as determined by the relative positioning of the cam members in the grooves provided on the surface of the timer drum, in response to the application of fluid pressure thereto under the control of the valves which are opened and closed by the cams.

Being therefore the sequential operation of the different elements of the glassware forming machine controlled by the positions of a plurality of cams arranged in a corresponding plurality of grooves circumferentially extending on the surface of the timer drum, it is quite obvious that the timing operation cannot be considered as very accurate, because being the cams adapted to be adjustably positioned in their respective axially spaced grooves at points on the drum surface which coincide with the position of respective valve operating members at the times at which such valves are to be operated, when said cams are positioned, normally by the tightening of nuts or the like, said positioning of the cams on the timing drum is an inexact procedure at best when the drum is stationary, but it becomes a time-consuming and painstaking task to locate and secure the cams with any degree of accuracy when the drum is rotating.

While the cam position may be more or less accurately adjusted with the drum stationary at the start of a run, it is generally necessary to adjust the position of said cams when the machine is operating, in order to secure an efficient function of the mechanisms of the machine. It is generally undesirable to stop a machine during a run to permit adjustment of a cam, since, as is well known in the art, glass forming machines desirably achieve and maintain a thermal balance upon continued operation, and therefore sometimes it becomes necessary to carry out adjustment of certain cams when the machine is working and thus the drum is rotating. On the other hand, even if the operator succeeds in loosening the clamp or nut of the cam, repositioning the cam as accurately as possible and retightening said clamp or nut, continuous use of the timing drum and the cams causes mechanical wear of the cam surface or of the follower associated with the valve member that operates the cam operated valve, whereby such wear sometimes delays the operation of the valve to a significant degree, resulting in irregularities in the forming operation and resultant production of rejects and unacceptable ware. Finally, the worn cam surfaces may ultimately fail to actuate the cam follower operating the valve, whereby the operation of the machine will no longer be satisfactory for carrying out the process for manufacturing glassware.

In an effort to avoid the aforementioned problems, electronic control systems have been devised in the past, by providing electronic circuits and counters for determining the number of degrees of rotation associated with each operation of a glassware forming machine, to accurately proportion the duration of said operations and the sequence thereof, so as to avoid the mechanical failures of the cam members of the very well known mechanical timing drum.

Thus, for instance, in U.S. Pat. No. 3,762,907 to Quinn et al., patented Oct. 2, 1973, an automatic electronic control system is disclosed which controls and maintains the sequence of events constituting the various steps of ware formation with a degree of accuracy unobtainable by the mechanical timing drum. The sequential timing of the operations of each forming section of the machine, in accordance with the above mentioned patent, is accomplished by means of a timing pulse generator located on the drive shaft of the machine, which generates one pulse for every degree of rotation of the shaft, while a reset pulse generator is also mounted on said drive shaft for generating one pulse for every 360° of rotation of the shaft, in order to reset the control for commencing a new cycle of the machine. Said control contains electronic circuitry and memories to store sufficient information to carry out in sequence the different operations of each section of the machine. By this means, the timing of the operation of a function may be altered by the mere manipulation of a switch, such as a thumbwheel, as opposed to the somewhat cumbersome procedure of adjusting timing cams as was necessary in the prior art mechanical timer drum.

The sequential timing pulses and the reset pulses which are generated by the pulse generating means under the influence of the rotation of the main shaft, are taken to a sequence distributing circuitry in order to distribute the sequential and reset signals to the plurality of individual forming sections contained in the machine, and the electronic control system in accordance with this patent also contains emergency stop means as well as programmed stop means for each section of the machine, that enable emergency stop of all the mechanisms of the machine or alternatively, a programmed stop in which the related machine section will proceed automatically through a sequence of events required to place the several elements in a safe position and ready for access to the operator.

The electronic control system disclosed in U.S. Pat. No. 3,762,907, however, represents a mere replacement of the mechanical timer drum and in essence acts in much the same manner as said timer drum, inasmuch as what this electronic system accomplishes is the mere replacement of the cams of said mechanical timer drum by electronic modules or circuits and the sequential programming of the electronic system is practically the same as the sequential positioning of the cams in the grooves of the timing drum. On the other hand, while this electronic control system is capable of changing or shifting the timing of relative variables, and it may be easily concluded that relative variables (that is, timing of operations that are computed as a proportion of the duration of the cycle) may be accurately shifted with the selection of a position of a predetermined number of switches, it may also be easily concluded that the handling and changing or shifting of absolute variables (that is, duration of operations which are independent of the duration of the total cycle) can hardly be accomplished, because this control system is not equipped to effect such changes and even if it were, there is no way of testing the new times selected by the operator and there is no way of knowing in advance if the times selected are correct in order to prevent cutting down certain variables that cannot be decreased or lenghtening other variables that cannot be increased, in order to coordinate them within the total duration of the cycle.

In other words, if the absolute times selected by the operator are not accurate and proper, then this must be learned the hard way, because said mistakes cannot be detected until the machine commences normal operation and the thus formed goods are determined to be defective.

On the other hand, in glassware forming machines there are certain operations that have been considered highly critical, such as the time in which a glass gob is cut and delivered by the glass gob feeding and distributing means, the time when the glass gob released by the glass gob feeding and distributing means falls within a blank mold and the time when the blank forming operation commences, that is, when the blowing or the pressing of the gob is started. It may well happen that a glass gob is not properly cut and therefore the blank mold does not receive the appropriate load to work on and it also may happen that the scoops and guiding channels lose the glas gob along their length for certain reasons or it may also well happen that the glass gob takes an extremely long time to fall down into the blank mold, and these failures, if not properly detected, may cause a highly defective operation of the machine.

The remedies to these faults are rather simple to achieve, inasmuch as it may merely take lubrication of the scoops and channels or it may take the mere cleaning of the shear that cuts the glass gobs, in order to accomplish an appropriate and perfectly timed operation of the machine. On the other hand, if the blank forming operation does not commence at the appropriate time after the glass gob has fallen into the blank mold, then the very well known "settle-wave" defect appears in the parison; and also the remaining sequence of steps, and particularly the reheat and stretch operation, cannot be carried out properly because a delay in commencement of the blank forming operation, may cause a corresponding and unadmissible reduction in the time allowed for this reheat and stretch operation in the machine.

The electronic control system in accordance with U.S. Pat. No. 3,762,907, does not contain any means to accurately control these highly critical operations, whereby it has left much to desire and may be considered as a mere improvement over the mechanical timing drum, in the sense that, using exactly the same principle of said mechanical drum, it has replaced the timer cams and cam followers which actuate cam operated valves, by a set of electronic circuits which actuate on solenoids that in turn actuate electrically operated valves. Otherwise, it may be said that the above systems are exactly the same, with the only advantage that the electronic system of Quinn et al. is not subject to such a drastic mechanical wear as is the mechanical timing drum, in view of the fact that the latter uses cam surfaces and cam followers which may wear out in time.

Another slightly different type of electronic control system for glassware forming machines is disclosed in U.S. Pat. No. 3,877,915 of Dudley et al., patented Apr. 15, 1975. This patent discloses an electronic control system which operates on the basis of determining the duration of certain modes of operation within the cycle and also depends on a counter counting degrees or fractions of a degree, for providing a preset count to be compared by means of a computer with an actual count, in order to actuate the different mechanisms of the machine when both counts are equal. This electronic system also provides for the possibility of manually altering the boundaries of each mode by predetermined increments to improve the machine efficiency at the press of a button. The related machine functions are automatically revised as required in accordance with the preset program and the selected change is automatically cancelled if any of these functions is outside of predetermined limits.

By providing a computer which compares, as mentioned above, two inputs, that is, the current total count shown by a counter and the preset count stored in a table of settings subprogram, and by providing means for rejecting any setting or resetting of the boundaries corresponding to each of the modes of operation in which the cycle is divided, whenever this setting or resetting is effected by manually operable means, such as the very well known thumb wheels for example, or in other words, by the provision of a subprogram contained in each unit of operation which will determine whether the proposed change of the duration of relative functions will exceed predetermined limits set for it, the control system of U.S. Pat. No. 3,877,915, solves the problem of having to take the risk of operating the machine with reset functions and thus avoids the problems caused by the electronic circuit of U.S. Pat. No. 3,762,907, in the sense that the electronic system itself will not accept any change in the functions which will not be within the boundary limits of each of the modes of operation in which the complete cycle of the forming unit has been previously divided by the main program fed into and stored in the computer.

In other words, when it is desired to change the timing or the duration of certain functions of the elements of the machine to accomodate for a run of a different type of glassware, then the operator may manually change or shift or reset said functions, but the computer will not accept the changes if they do not fit with the duration provided within the cycle for each of said modes of operation within the boundaries previously fixed for each said mode of operation, thus warning the operator that the degree signals fed to the computer are not correct and that, therefore, a new resetting must be made.

However, still with this remarkable improvement over the prior electronic control systems for glassware forming machines, the control system of U.S. Pat. No. 3,877,915 is still somewhat inefficient in the sense that, even when it provides for the rejection of a certain resetting of variables that have been manually entered by the operator, thus warning the operator that the degree signals fed to the computer are not correct, it does not furnish the operator with a clear indication as to where the error must be located, whereby the operator must test several different resettings until the computer accepts one of them to operate under the new timings (measured in degrees of rotation) that are necessary for a new run. This undoubtedly, is a definite drawback of the electronic system of U.S. Pat. No. 3,877,915.

Also, the above described electronic control system does not provide for signal feedback into the same, in order to suitably control the most critical functions of the forming sections of the machine, for instance, the glass gob cutting operation, the passage of the released glass gob out of the guiding channels and into the blank mold, and the commencement of the blank forming operation, whereby the same comments stated above in connection with the electronic control circuit of U.S. Pat. No. 3,762,907 fully apply.

SUMMARY OF THE INVENTION

Accordingly, it is an object of the present invention to provide an electronic timing control system for glassware forming machines which controls and maintains the timing and sequence of events constituting the various steps of ware formation with a degree of accuracy unobtainable by mechanical timing systems.

It is another object of the present invention to provide an electronic timing control system for glassware forming machines which will operate in real time and will therefore avoid the counting of degrees of rotation to compute the total duration of the ware forming cycle.

It is another object of the present invention to provide an electronic timing control system for glassware forming machines, of the above described character, which will permit the modification of the sequence of events constituting the steps of ware formation and will at the same time permit to test the modified sequence without a glass load in the machine.

Still another object of the present invention is to provide an electronic timing control system for glassware forming machines, of the above described characteristics, which will provide for signal feedback in order to control the most critical operations of the machine and to warn the operator of any malfunction in said critical operations through the actuation of a display and warning lamps.

A still more particular object of the present invention is to provide an electronic timing control system for glassware forming machines, of the above mentioned character, which will provide for the selection of manual operation of the main mechanisms of the machine, as well as for unloaded test operation and fully automatic loaded operation.

Still other object of the present invention is to provide an improved electronic timing control system for glassware forming machines, in accordance with the above, which will be capable of modifying the timing of relative variables and the duration of absolute variables and will reject, at the outset or during operation, said modifications if they have not been fed to the control system consistently with the basic equation of the cycle.

Another object of the present invention is to provide an improved electronic control system for glassware forming machines, of the above mentioned character, which will require one single feedback signal for determining the duration of the total glassware forming cycle and for triggering the initiation of the next cycle.

A still more particular and important object of the present invention is to provide an improved electronic timing control system for glassware forming machines having the above described characteristics, which will provide for the manual adjustment of the speed and the duration of operation of each one of the main individual mechanisms of the machine, without requiring the operator to provide for the inhibition of the remaining mechanisms.

The foregoing objects and others ancillary thereto are preferably accomplished as follows.

According to a preferred embodiment of the present invention, an electronic timing control system for glassware forming machines comprises a controller having a fixed memory or sequence producing circuits to store the sequence of the different operations of the glassware forming cycle, a floating memory to receive timing signals from the operator for a particular product and to reclaim the processing signals of said fixed memory in order to produce a timed sequence, a sequence distributing circuit to decode the timed sequence signals produced by said fixed and floating memories and to distribute the same to each one of the several forming sections of the machine, and input/output means to channel signals into an out of the controller; a first sensor to determine the instant in which the shear cuts a gob to be fed into each section of the machine, to provide a single feedback signal for determining the end of a prior cycle and the initiation of a new cycle, which will be effected between each pair of said signals of said glass gob release sensor; a second or temperature sensor which senses the passage of a molten glass gob into a blank mold and feeds back a signal which triggers the actuation of the parison forming mechanisms; and a third or pressure sensor to sense the commencement of the parison forming operation within the blank form either by pressing or blowing of the glass gob within said blank mold and feed back a signal that triggers the remaining program of the forming cycle. A real time clock provides a time count expressed in units of time in order to measure the real times marked by the signals back fed by the sensors to the controller and the latter triggers the initiation of a new cycle in response to the signal of the first sensor, the initiation of the operation of the parison forming means in response to the signal of the second sensor, and accurately determines the duration of the parison forming operation in response to the signal of the third sensor. The sensors feed back signals into the controller, which has previously received instructions that are preserved in its memory about the time of duration of each of the operations controlled by the sensors starting from each sensor signal. In this manner, the operations are effected taking as a basis the back fed signals and thus the system is perfectly capable of handling both absolute and relative variables within the cycle. The electronic control system in accordance with the present invention also has a plurality of manual switches to select the timing and duration of relative variables and of absolute variables, which feed into the memory the selected times, which may be chosen at will by the operator of the machine and means are also provided to reject said manually fed times when the same are not consistent with the equation that governs the cycle of operation.

The system of the present invention is also provided with operator controlled means to simulate the times provided by such sensors, in order to enable the machine to operate through tests without a load of glass therein, which enables the operator to check if the times fed into the control are to work in an appropriate manner.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will be best understood from the following description of a specific embodiment, when read in connection with the accompanying drawings, in which:

FIG. 6 is a bar graph of the main signals commanding the operation of the machine shown in FIGS. 3 to 5, clearly indicating the initiation of each of the actions of the different mechanisms of the machine and the duration of the operation of each of said mechanisms.

DETAILED DESCRIPTION

Figure 1:
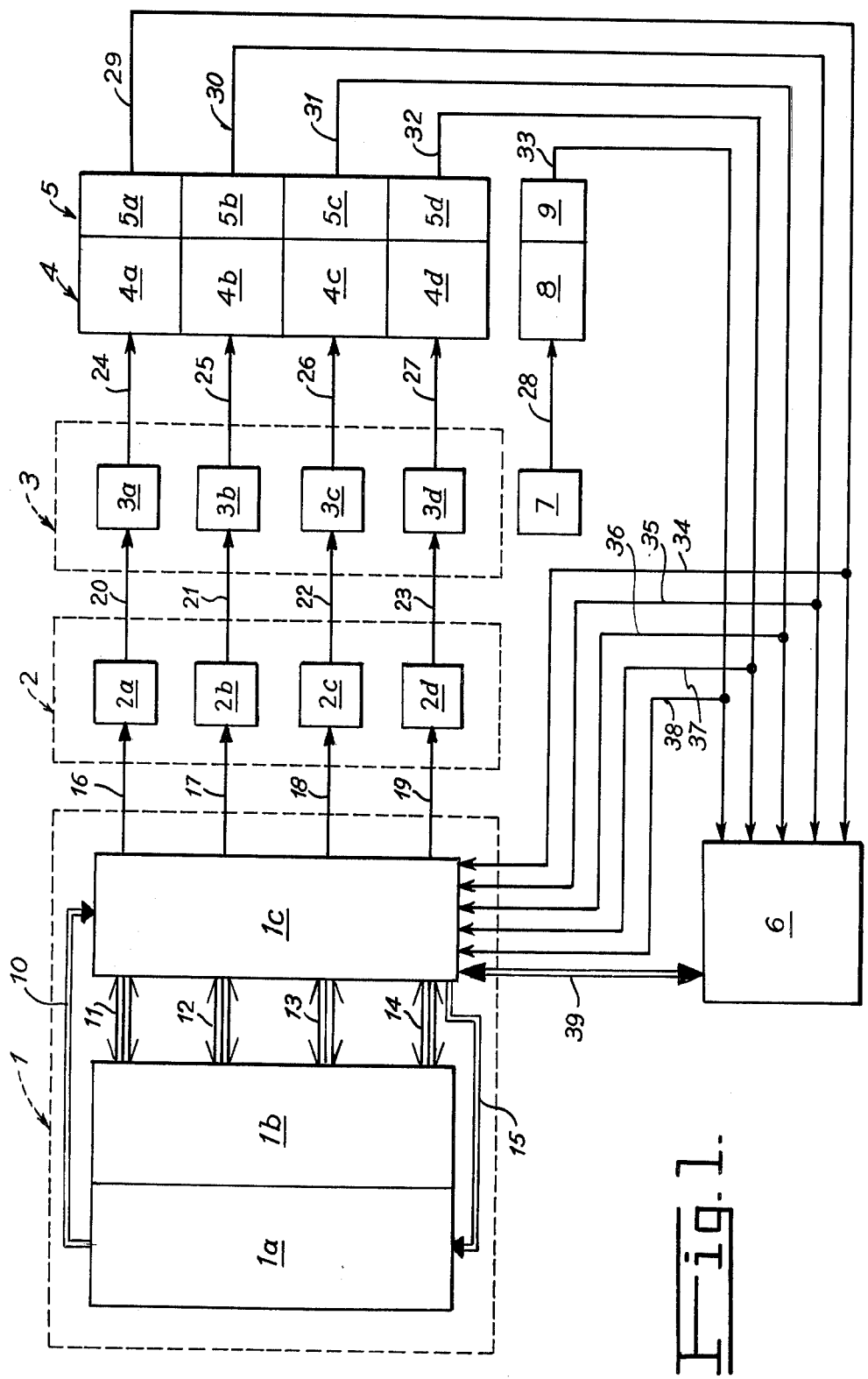
FIG. 1 is a block diagram of the main parts of the electronic timing control system built in accordance with the present invention.
Figure 2:
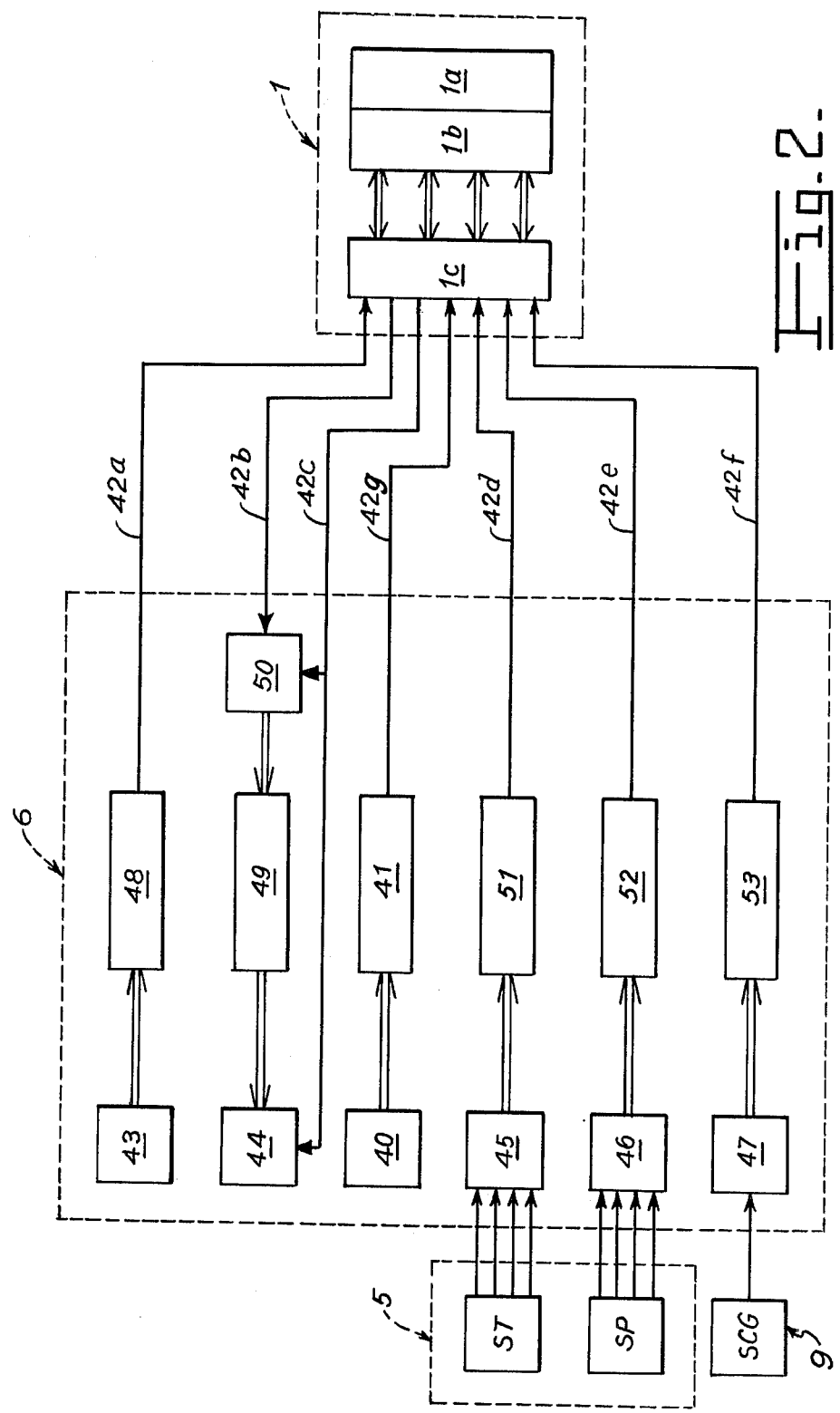
FIG. 2 is a block diagram of the operator panel with the main modules contained therein and its relation to the controller of the control system shown in FIG. 1.

Having now more particular reference to the drawings, wherein like parts are designated by like reference characters throughout the various figures whenever possible, and particularly to FIGS. 1 and 2 of said drawings, there is shown an electronic timing control system for multiple forming section glassware forming machines, and while said drawings illustrate the control system of the present invention working in connection with a four unitary forming section machine, it must be understood that the control system of the instant invention may be applied to carry out the control operations of any type of glassware forming machine having any number of individual forming sections and having any different designs to carry out, for instance, hot mold processes or paste mold processes, whereby the illustration which will be described hereinafter must be considered as merely exemplifying and not restricting of the true scope and spirit of the present invention.

The control system of the present invention as more particularly illustrated in the block diagram of FIG. 1, comprises controller 1, a multiplicity of signal amplifiers 2, a block of electrically operated valves 3, the different sections of the machine 4 themselves, having fluid operated linear motors that receive the fluid signals sent by the valve block 3, a plurality of sensors 5 in each of the sections of the machine; a common glass gob feeding and distribution means 8, actuated by a synchronous motor 7 or similar actuator and having a sensor 9, and an operator panel 6.

The controller 1 is formed mainly by three modules, all respresented by means of respective blocks and the basic operation thereof will be described in terms of the operation of said devices on the signals provided by the control. The controller 1 comprises a memory and sequence producing circuit 1a, a sequence distributing circuit 1b and also an input/output device 1c, to which are fed the timed sequential distributed signals such as 11, 12, 13 and 14 to be thereafter fed to the different sections of the machine. From the input/output means 1c of the controller 1, signals are sequentially and orderly sent in accordance with the program contained in the memory and sequence producing circuit 1a, through signal amplifiers 2a, 2b, 2c and 2d which in turn condition and amplify the signals 16, 17, 18 and 19 received from the input/output device 1c, in order to produce conditioned and amplified signals 20, 21, 22 and 23, each of said signals to be fed to a valve block 3 comprising a plurality of electrically operated valves such as illustrated by means of the blocks 3a, 3b, 3c and 3d, which electrically operated valves produce fluid signals 24, 25, 26 and 27, respectively, with each of signals 24, 25, 26 and 27 being fed to the different fluid operated linear motors which in turn actuate the individual mechanisms of each section of the machine 4, which in the particular illustration of FIG. 1 are represented by blocks 4a, 4b, 4c and 4d. Each machine section 4a to 4d is provided with a pair of sensors that will be more fully described hereinafter, illustrated by means of the blocks 5a to 5d, from which feedback signals 29 to 33, respectively, are sent to the operator panel 6 and to the input/output device 1c of the controller 1, through lines 34 to 37, respectively.

The common glass gob feeding and distribution device 8 is actuated by means of a synchronous motor or the like, identified by reference character 7 which sends a signal 28 to the feeding and distribution device 8 in order to cause the release of a glass gob, and a glass gob release sensor 9 feeds back a signal through line 33 to the panel operator 6 and through line 38 to the input/output device 1c of controller 1.

The different elements contained in the operator panel 6 communicate with the input/output device 1c through a plurality of lines contained in a duct diagrammatically illustrated at 39, and the input/output device 1c feeds back the signals received from the different sensors, either directly to the memory and sequence producing circuit 1a through a plurality of lines 15 or to the sequence distributing means 1b through a corresponding plurality of lines such as 11, 12, 13 and 14 to thereafter pass into the memory and sequence producing circuit 1a. The memory and sequence producing circuit 1a in turn sends signals to the operator panel 6 through lines 10 via the input/output device 1c.

In this manner, the control system of the present invention is capable of feeding a plurality of sequencing and timing signals into each one of the sections 4a to 4d of the machine and into the glass gob feeding and distributing means 8, respectively, whereas the sensors 5 and 9 are capable of back feeding signals into the controller in order for the latter to respond to any change in said signals and in order to enable the control to calculate the duration of the cycle of operation of each section of the machine, on the basis of the signal produced by the sensor 9 of the glass gob feeding and distributing means 8, which is fed through lines 33 and 38 into the controller.

The operator panel 6 is more clearly illustrated in FIG. 2 of the drawings, and mainly comprises a plurality of digital switches 43, which provide the means for the operator to select the timing and the duration of some of the signals to be fed into the machine by the controller 1, and are capable of selecting different timings of the signals as well as the duration thereof. Said signals are fed to a multiplexer 48 to thereafter be fed to the input/output system 1c through line 42a contained in duct 39 and to the memory of the controller wherein the times fed by the operator by means of the digital switches 43 remain stored for further use thereof in both the test operation without a glass load of the machine and the fully automatic operation of said machine with a glass load.

A digital display 44 is also provided in the operator panel, which is fed with signals from a binary to BCD converter 49 which receives the corresponding signals from a decoder 50 and said decoder receives the signals through the line 42b from the input/output means of the controller 1 and both the display and the decoder are controlled by the controller through line 42c. The operation of these devices of the operator panel 6 is as follows: When the operator selects semiautomatic or unload test operation of the machine, for instance, firstly the displays illustrated by block 44 are reset to zeros. The control at this time is awaiting for the first set of times of operation that the operator must feed by means of the digital switches 43, and once these times have been selected, the operator presses a readout button, whereby these times are passed into the control system to be incorporated in its memory 1a. After the controller has received these times, it sends signals the operator panel, whereby the digit 1 is entered into the first display, which indicates that the first times have been accepted, whereafter the operator may proceed to repeat the operations with the subsequent sets of times, whereby the corresponding ascending numerical signals sequentially appear in the remaining displays 44 the same as above. Once these times have been already accepted by the controller, the operator may press a initial position button with which all the mechanisms are placed in its initial position or starting position to commence simulation of the operation of forming glassware in a sequential manner upon pressing the start button after the display has returned to zeros.

The operator panel also has a set of three sensor signal receiving cards 45, 46 and 47. Card 45 receives the signal provided by the temperature sensor ST of the sensors 5 which warns the operator when the glass gob has passed out of the guiding channels of the machine and into the blank mold thereof. This signal is thereafter conditioned by means of a conditioner card 51 and from said card it is fed into the controller 1 by means of line 42d. Similarly, the sensor signal receiving card 46 receives the signal sent by the pressure sensor SP which marks the commencement of the blank forming operation in the machine, and this feedback signal is also channeled through a conditioning card 52 and through line 42e into the controller 1. Finally, the sensor signal receiving card 47 receives the signal from the gob release sensor 9 (SCG) which indicates when a glass gob has been released at the glass gob feeding and distributing means, and this feedback signal is conditioned by means of a conditioning card 53 and fed into the controller 1 through line 42f.

By these means, the controller receives feedback signals from each of the three above described sensors, whereby to accurately control the operation of the most critical variables of the machine, namely, the glass gob cutting operation, the glass gob feeding operation into the blank mold, the commencement of the forming operation of the parison within said blank mold either by pressing or by blowing of the glass gob, and as a consequence the duration of the parison forming operation.

In view of the provision of the digital switches 43, the operator will also be perfectly capable of selecting a strictly manual operation, wherein the operator selects the corresponding switch in his panel, in order to select the manual operation and thereafter, in one of the sets of digital switches made available to him in the panel, the operator selects the mechanism or the pair of mechanisms to be actuated individually and at the same time selects the duration of the actuation of said mechanism, which is rendered very slow as compared to the other modes of operation, whereafter the operator presses the start button of the machine and in this manner the selected mechanism works alone and gives every opportunity to the operator to adjust the time necessary in accordance with the speed thereof through the valves 3 which actuate the corresponding mechanism in the machine. This individual selection of mechanisms is possible because the controller does not apply the cycle timing signals when the selector switch is worked to select manual operation. In this manner, the operator is perfectly capable of selecting every one of the mechanisms of the machine to be manually adjusted while the remaining mechanisms remain deactivated.

The semiautomatic operation, that is, the operation of the machine without a glass load, is also made possible to the operator, as partially described above. In other words, the operator may select any number of signals for timing and fixing the duration of operation of the different elements of the machine by means of the digital switches, whereafter he may press the reset button and then the start button whereby the machine will commence to work without a glass load. As the three sensors (gob release, temperature and pressure) contained in each section of the machine do not work with the semiautomatic mode of operation, then the operator panel has a variable frequency oscillator which may be operated in order to simulate the time signal otherwise fixed by the glass gob release sensor SCG, and the semiautomatic operation may be carried out for testing all the times fed by the operator into the memory of the device, whereby to correct any error that may have been entered in connection with the timing and the duration of the different signals to be sent by the control to the operating valves of the machine.

It will be apparent to anyone skilled in the art that the number and type of control and command devices that an operator panel may contain is subject to the nature of the operations to be performed and to the accuracy and intricacy of the process to be carried out, as well as to the reliability which is required from the control, whereby it will be also apparent to anyone skilled in the art that, besides the indispensable elements that may be inferred from the above description, an operator panel, which is the communication means between the operator and the machine, may also usually comprises a plurality of indicating or warning lamps, a plurality of inhibition switches to inhibit different operations of the mechanisms of the machine, a plurality of operational stage switches which determine and control the stage of operation which it is desired to carry out, emergency stop button, normal and programmed stop button, start button, reset button, selector button for modes of operation of the machine, on/off button, display reset button, and the like. These additional devices or switches are illustrated by block 40 in FIG. 2 of the drawings and the signals thereof are carried through a suitable conditioner card 41 and line 42g to the controller 1. Warning lights may be included in the operator panel to warn the operator about the functions or malfunctions occurring in the machine, such as the condition of manual or unload test operation of the machine, rejection of operation times, absence of a glass gob release by the glass gob feeding and distributing means, absence of pressing by the pistons (when a press-blow method is contemplated) or absence of a counter blow (when a blow-blow method is contemplated) and in the particular instance of the control system of the present invention, which contains sensors, also detection of failures in said sensors.

The control system in accordance with the present invention, contrary to what was customary with the electronic control systems of the prior art, does not produce the sequence and the timing of the different operations by means of a counter (generally a degree counter), but rather it contains a real time clock or constant frequency pulse generator, which measures the cycle in units of time rather than in degrees that must thereafter be converted in units of time through intricate mathematical operations, whereby this permits the control of the present invention to handle both absolute variables and relative variables, namely, it permits the control of the instant invention to fix the duration of any absolute variable and also the druation and timing of any relative variable, which was not possible with the electronic control systems of the prior art, inasmuch as the latter were dependent on a number of counts produced by a counter, which counter generally was dependent on the counting of degrees of rotation around a rotating shaft which was normally the main drive shaft of the glassware forming machine.

The provision of a counter depending on the count of the 360° of the circumference of a rotating shaft to measure the duration of the cycle and to distribute the timing and duration of all the operations to be performed within this cycle, presented the very serious drawback that it is practically impossible to maintain an accurately constant rotational speed in the main or drive shaft of the machine, whereby variances of said rotational speed produced consequent variances in the duration of all the functions or variables, all of which were relative variables, whereby the real times provided for certain critical variables could not be maintained constant, and this produced serious defects in the glassware formed by the prior art machines.

In other words, being the performance of the electronic control systems of the prior art solely dependent on the fixation or setting of the timing of all the operations through the use of a certain number of degrees which were counted by the counter, all the variables present in the so called table of setting and fed into the memory of the electronic control system of the prior art machines, were expressed as a proportion of the total cycle duration which was normally determined by one full rotation of the main shaft of the machine, whereby, if the real time of duration of the total cycle was modified either accidentally or otherwise, then the duration and timing of all the operations and functions was proportionatelly modified, including all critical variables such as the pressing or blowing time for forming the parison, or the reheat and stretch time which must also be preserved, whereby this type of a system prevented the maintenance of these critical variables as absolute variables which would not be affected by variations in the real time taken by the counter to produce a full cycle of operation of the machine.

The electronic control system of the instant inventon, contrary to the prior art electronic control systems, regulates the duration of a cycle by the use of a constant frequency pulse generator or real time clock, and also fixes the duration of the total cycle by the production of one single signal, namely, the signal which indicates when a glass gob is released at the glass gob feeding and distributing means. The prior art control systems also generally started and ended a cycle precisely at the same point, but the only means of actually fixing the duration of the cycle was to maintain a constant speed of rotation of the shaft, since point zero of the circumference rotated by said shaft was made to match with the glass gob cutting operation at the glass gob feeding and distributing means, but otherwise the real time of duration of said cycle was uncontrollable by any means.

The real time clock used in the instant control system to fix the duration and the timing of all operations, as well as the total duration of a cycle, provides for the maintenance of a constant real time of duration of said cycle, inasmuch as the cycle is determined by a number of units of time which count is initiated from a real time signal, rather than by a number of angular units of rotation which count is initiated at a geometrical point independent from the real time, as was customary in all the systems of the prior art which, therefore, did not represent other than a mere replacement of the cams and followers of the mechanical timing drum, by a plurality of electronic modules that performed the same functions of the cams.

Being the duration of the total cycle fixed by a real time clock to operate between one single repetitive signal, namely, the signal produced by a first sensor which senses the instant in which the shear of the glass gob feeding and distributing means cuts and releases a glass gob, it is obvious that the exact duration of all the operations to be performed by the machine, as well as its sequential timing, is secured by these means and thus the variation of the critical variables that must be maintained as absolute variables that must take exactly the same time regardless of the total duration of a cycle, is efficiently prevented.

The use of a real time clock or constant frequency pulse generator for controlling the timing and duration of the different operations of the machine during one sigle cycle of the said machine, could not be complete if a plurality of sensors to feed back certain critical signals to the controller is not included.

Figure 4:
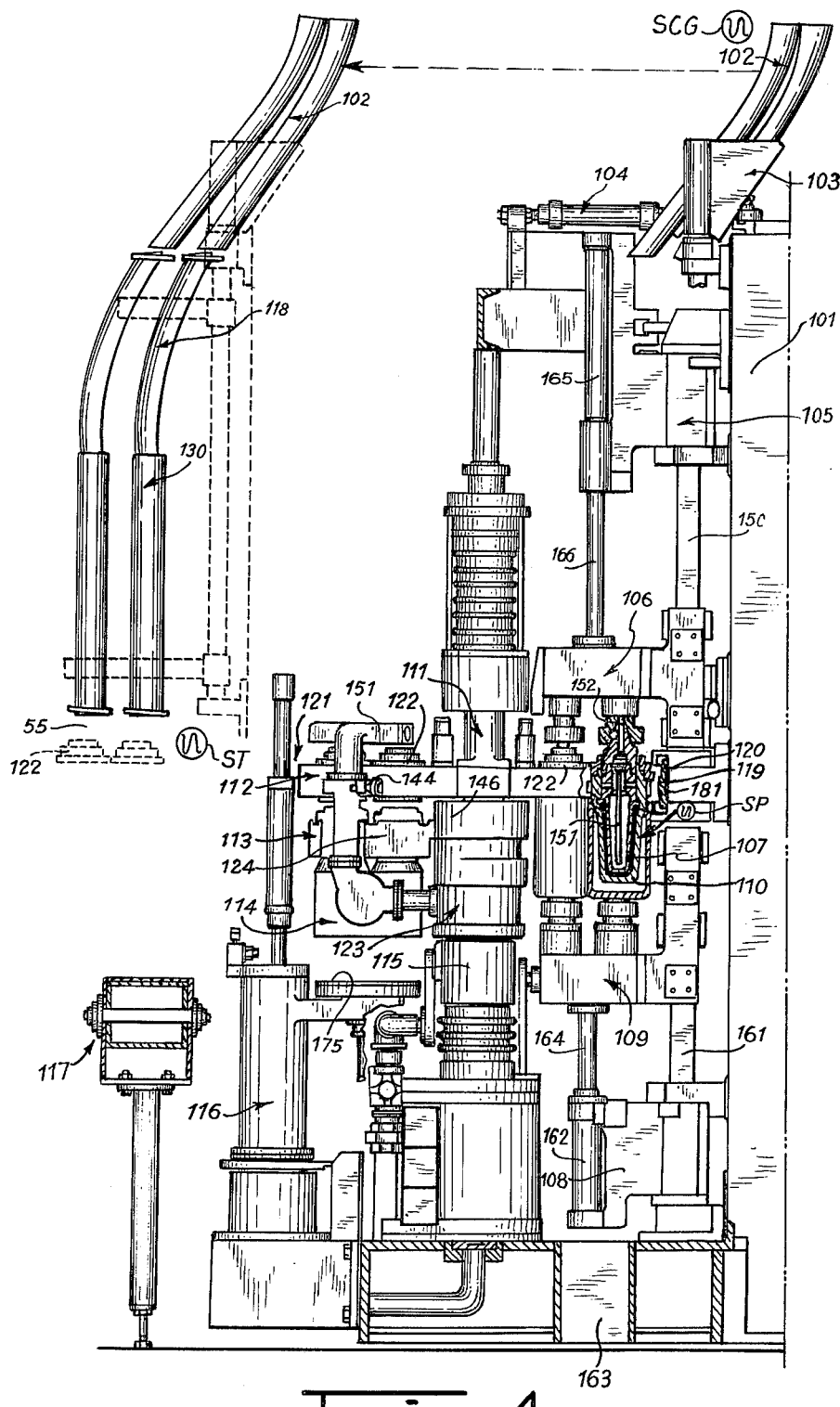
FIG. 4 is an elevational view with parts removed to show inner details thereof, and with the guiding channels separately illustrated for clarity purposes, of one of the individual forming sections of the glassware forming machine illustrated in FIGS. 3 and 4, in order to exemplify the use of the automatic electronic timing control system of the present invention to control the operation thereof.

Therefore, the electronic timing control system of the present invention is provided, at each unitary forming section of the glassware forming machine with which it is associated, with three different sensors that were briefly mentioned above and that have been exemplarily illustrated by means of the diagrammatic signs identified by the reference characters SCG (gob release sensor), ST (temperature sensor) and SP (pressure sensor) in FIGS. 1, 4 and 6 of the drawings, which illustrate a particular embodiment of the possible use of an electronic control system built in accordance with the present invention. It must be understood, however, that the position and arrangement of these three sensors is exactly the same with all types of machine, inasmuch as all modern glassware forming machines contain the same type of glass gob feeding and distributing means located at the top of the machine, as well as the same type of scoops and guiding channels to feed the glass gobs into a blank mold, and the same type of blank mold to receive the glass gob to be thereafter pressed or blown in order to form the corresponding parison to be processed up to the finished glassware.

In other words, while the unitary forming section of a glassware forming machine illustrated in FIG. 4 of the drawings corresponds to a machine working on the press-blow method of forming, and while this unitary forming section illustrated in FIG. 4 corresponds to a special modern and novel type of glassware forming machine as described and claimed in copending Mexican Patent Applications Nos. 169,221 and 169,222 filed on May 30, 1977, it will be apparent to anyone skilled in the art that the set of three sensors may be used in much the same manner in any other type of machine, regardless of the fact that it may work on the hot or paste mold method, or may work on the press-blow or blow-blow mode of operation.

It will also be apparent to any one skilled in the art that the number and location of the sensors may be varied without thereby departing from the spirit of the invention. For example, additional feedback sensors may be included to control and optimize the real time of any other operation that for a particular machine or process may appear to be critical, in order to secure the accurate initiation and duration thereof in real times.

In order to clearly understand the remarkable improvements represented by the inclusion of these three sensors in an electronic timing control system for a glassware forming machine, which sensors provide feedback signals to be back fed to the controller of the electronic system of the present invention illustrated by the reference character 1 in FIG. 1 of the drawings, a very brief comparative description of the most critical operations of a glassware forming machine will be made hereunder, because the inclusion of these three sensors represents one of the main objects of the present invention.

In glassware forming machines, the first operations to be effected are to firstly release a glass gob from a supply of molten glass, and to receive the released gob onto a scoop on which the gob slides down to reach a guiding channel which guides the same down to the mouth of the blank mold. Thereafter, the guiding channels are removed out of the loading position and a piston or a blowing pipe is actuated in order to press or blow, as the case may be, the glass gob received within the blank mold, so as to form a suitable parison, The duration of the pressing or blowing operation of the glass gob to form the parison is highly critical and must be set, by experiment or otherwise, at a proper figure timewise, in order to provide for a good formation of said parison, as otherwise the finishing operations of the glassware will not result in the production of a high quality article.

On the other hand, if the glass gob is left on the bottom of the blank mold a time longer than what is absolutely necessary to commence the parison formation operation, either by pressing or by blowing the glass gob, then the surfaces of the glass gob in contact with the blank mold generally settle and form a hard and resistant skin, whereby, when an attempt is made to press or blow this glass gob having this hardened skin, the distribution of the glass for forming the parison is not at all uniform in view of the fact that the hard and resistant skin tends to remain in the same place where it was, whereby a highly defective parison is obtained. This defect which is very frequently obtained in the prior art machines, has been called "settle wave" and the occurrence thereof is frequent in said prior art machines in view of the fact that there is no way of controlling the timing of the commencement of the parison forming operation after the glass gob has fallen on the bottom of the blank mold, in view of the reasons that will be set forth in what follows.

In all prior art machines either controlled by a mechanical timing drum or by a prior art electronic control circuit, the duration of all the operations, as already mentioned above, depends on a number of counts produced by a counter which is normally controlled by the rotation of the main shaft of the machine. When a glass gob is released from the glass gob feeding and distributing means, a zero point on the cycle operation of all prior art machines is set, whereby the counting of the number of degrees assigned to each following operation commences. While the number of degrees that the glass gob fall must or should take to reach the bottom of the blank mold is generally found through painstaking experimental activities, it is always possible that the fall of a glass gob may be delayed up to the point that the pressing piston or the blowing pipe commences operation before the glass gob has duly settled on the bottom of the blank mold. In the opposite direction, variations of the speed of rotation of the controlling shaft, may cause an anticipated fall, as related to the time, of the glass gob into the blank mold, because the assigned number of degrees will take more real time if the speed of rotation of the shaft has decreased, whereby the glass gob will remain deposited in the bottom of the blank mold a time which may be sufficiently long to cause settle-wave the parison.

As in all prior art control systems the commencement of the parison formation operation is controlled by a certain number of counts or degrees, then it is obvious that there is no way of securing that the commencement of said operation is actually timed in relation to the actual time of falling of a glass gob into the blank mold, in view of the variations that the rotational speed of the controller shaft may have.

Therefore, the timing of the glass gob fall through the scoops and guiding channels and into the blank mold, is highly critical and must be considered as an absolute time or an absolute variable, which absolute variable must be kept with a constant duration regardless of variations in the duration of the total cycle of operation.

The electronic timing control circuit of the present invention, by having a real time clock or constant frequency pulse generator, prevents any variation in the duration of the total cycle and, therefore, prevents the frequent defect caused by the settle-wave, inasmuch as this highly critical variable is kept constant in real time, whereby this secures that the commencement of the parison formation operation will be timed quite accurately after the glass gob has been deposited in the bottom of the blank mold. However, it may well happen that the fall of the glass gob through the scopps and channels is delayed because the friction caused thereby has unadvertently increased in view of lack of lubrication of said elements or the like, whereby regardless of the fixation of a real time for this variable (which is generally found experimentally as mentioned above), the temperature sensor ST provides a signal which represents a measure of the actual time elapsed between the signal back fed by the sensor SCG, and the signal back fed by the sensor ST, whereby a very accurate control means is provided for the glass gob fall stage and consequently for the timing of the parison forming operation. This may be accomplished in two different manners, in accordance with two preferred embodiments of the invention, that will be described hereinbelow.

In accordance with one embodiment of the invention, a time allowance is provided in the table of settings for a particular cycle, thus forming part of the cycle equation stored in the memory of the controller and will be always considered by the controller in order to compensate for delays in the different functions of the cycle, prior to triggering an alarm to warn the operator of such delay. With this in mind, it will be clear that even if the glass gob does not reach gap 55 (and thus sensor ST) within the time prescribed in the table of settings, an alarm will not be triggered. Rather, the controller will await for a certain additional time (generally one half) within said time allowance to trigger the alarm and the program. As the absence of a signal ST inhibits the action of the parison forming means in accordance with what will be more fully described hereinafter, this time delay allowed by the controller is highly useful to avoid such inhibition when the signal ST has been merely delayed. Once the alarm has warned the operator of the fact that an undue delay has occurred in the glass gob fall, he may take appropriate corrective measures such as lubrication of the scoops 102 and channels 118, 130 to bring back to normality the time of fall.

In accordance with another and preferred embodiment of the present invention, a precalculated equation representing the fall of the glass gob under different conditions of smoothness and/or lubrication of the scoops and channels if fed to the memory of controller 1. This equation is designed to trigger the action of the parison forming means prior to the arrival of the feedback signal from sensor ST so as to gain time in order to reduce as much as possible the settle wave in the gob. A comparator is included in the circuit to determine the differential between the time provided by said gob fall equation and the actual fall time determined by the feedback signal of sensor ST. An automatic lubricating mechanism is also included in the machine to lubricate the scoops and channels in accordance with command signals received from the controller in response to said time differential signal in order to maintain said differential within predetermined limits. When said limits are exceeded, meaning that the gob is not falling into the blank mold within a prescribed time, regardless of the action of the automatic lubricating mechanism, then an alarm is triggered the same as above. This automatic system is preferred in view of the fact that it permits more prompt actuation of the parison forming means on the glass gob, whereby it avoids in a practically absolute manner the possibility of confronting the settle-wave defect in the ware forming cycle. In this particular embodiment of the invention it will be apparent that the feedback signal of the sensor ST will serve the exclusive purpose of determining the time differential between the actual gob fall time and the time provided by the gob fall equation stored in the controller, as a means to trigger the alarm when said time differential grows beyond prescribed limits also stored in memory.

In view of the above, it will be clearly seen that the electronic timing control system of the present invention, by providing a real time clock for controlling the timing of the operations and by providing a pair of sensors such as the SCG and the ST sensors illustrated in FIG. 4 of the drawings, controls with a high degree of accuracy, unobtainable heretofore, the fall of the glass gob into the blank mold, thereby preventing the possible occurrence of settle-wave and other possible defects that may be due to the anticipation or delay in such fall, thus improving the quality of the ware formed.

The automatic electronic control circuit of the present invention, however, when working on the automatic mode of operation, does not handle this highly critical variable of the ware forming operation by the real time clock, inasmuch as the operation with glass is performed as follows. When the shear of the glass gob feeding and distributing means cuts and releases a glass gob, the sensor SCG (FIG. 4) senses the release of such gob and sends a feedback signal to the controller 1 of the control system, whereby the controller in turn sends a pulse which marks the commencement of a cycle and the end of the prior cycle. If such signal is absent, then the initiation of a cycle is not triggered and an alarm is lighted on the operator panel 6, advising the operator that all the mechanisms of the machine have been inhibited. Therefore, the control system of the present invention depends on one single signal for fixing the total duration of a cycle, contrary to the prior art systems which were dependent on the count of a certain number of degrees (360°) or on the count of a certain number of fractions of degrees (such as 720 counts and the like) as was customary with the prior art electronic control systems as well as with the mechanical control systems of the prior art.

The glass gob slides down the scoops 102 and channels 118 and 130 of the machine (FIG. 4) and, when passing through the gap 55 between the mouth of the vertical channels 130 and the mouth of the neck ring 122, is sensed by the sensor ST which sends a signal to the controller 1, which in turn immediately produces a signal for removing the channels 118 and 130 from operative position and places the piston mechanism 105 (in the case of a press-blow machine as is illustrated in FIG. 4), in order to commence the pressing operation at the proper time. In the absence of a signal from sensor ST, as described above, an alarm is lighted on the operator panel 6 and the actuation of the mechanism for lowering the pistons 107 is inhibited, but the remainder of the cycle operations are sequentially effected, whereby to avoid damages to the blank molds 110 caused by direct contact with pistons 107, for example, when a glass gob is not within said blank mold. In other words, the signal for placing the pistons and lowering them down into the blank mold 110, does not depend on a certain number of counts or degrees, but rather on actual time feedback signals produced by a pair of sensors SCG and ST as mentioned above. On the above has been effected, the pistons 107 commence pressing of the glass gob in order to form the corresponding parison, at which instant the third sensor or SP sensor (FIG. 4) sends a signal to the controller 1, advising that the pressing operation has commenced. The controller therefore is advised of the exact time when the pressing operation commences, whereby it starts counting a number of units of time by means of the real time clock, from this moment on, in order to secure that the duration of the pressing operation (or the blowing operation in the case of a blow-blow machine) to form a high quality parison, be kept within strict limits of duration, which was frequently not possible with the devices of the prior art.

The functions that are to be performed thereafter are not so critical as the functions described above, whereby from this time on, the electronic timing control circuit of the present invention carries out its functions much in the same manner as the electronic control systems of the prior art, except that in view of the existence of the real time clock to time all the operations, rather than the pulse counter depending on a rotational shaft or the like, which velocity cannot be accurately controlled, the electronic control system of the present invention is capable of keeping very accurate duration and timing of all the relative variables as well as the absolute variables that follow thereafter.

Therefore, the inclusion of the sensors SCG, ST and SP constitutes a remarkable improvement in the art of forming glassware by machine, inasmuch as the absolute time of the pressing or blowing operation for forming the parison may be kept constant and highly precise, contrary to the prior art devices wherein there is no way of knowing the real time taken by the glass gob to fall down the scoops and channels and the real time taken by the pistons of the pressing system to commence the forming operation of the parison.

Figure 3:
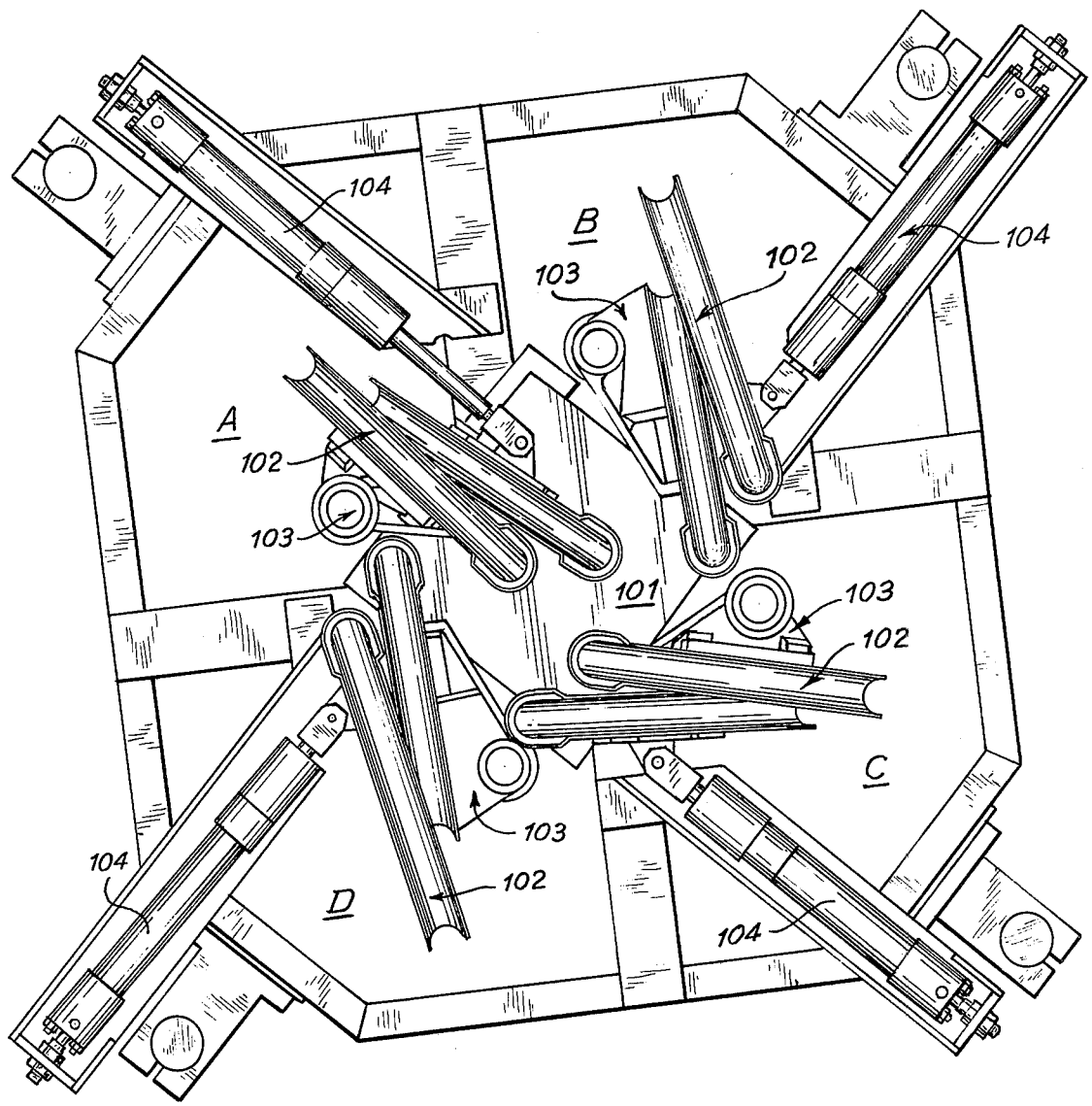
FIG. 3 is a top plan view of a four section glassware forming machine showing the scoop mechanisms of the glass gob feeding and distributing means, which will be used to describe a particular embodiment of the electronic timing control system built in accordance with the present invention.
Figure 5:
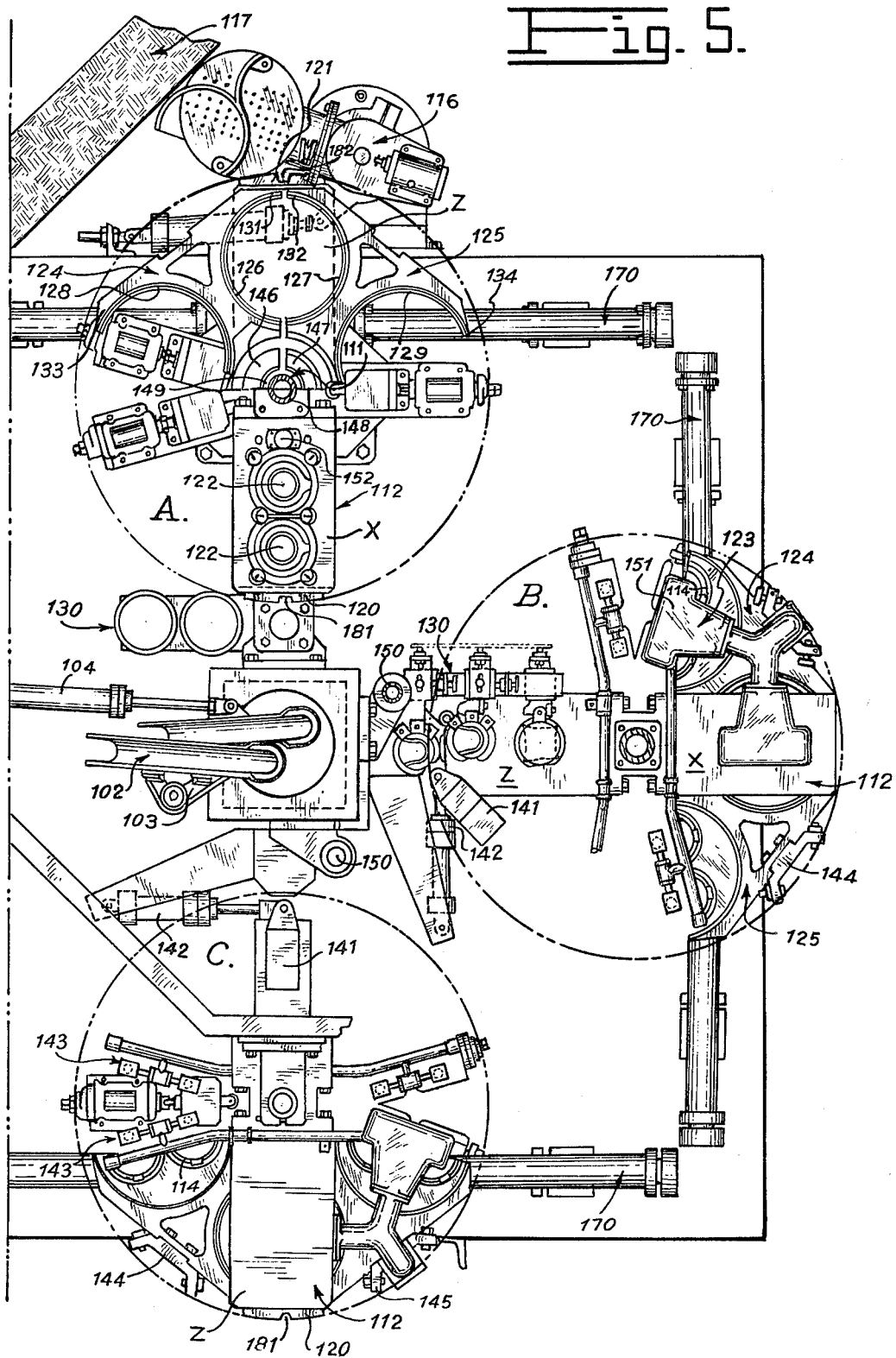
FIG. 5 is a plan view of part of the glassware forming machine shown in FIG. 3 but with portions removed to show different levels of the four forming sections thereof, to illustrate the main operating parts of said machine.

In order to more fully understand the operation and the advantages of the electronic timing control circuit built in accordance with the present invention and generally illustrated in FIGS. 1 and 2 of the drawings, said operation will be described in what follows as applied to the operation of a unitary forming section of a machine as illustrated in FIGS. 3, 4 and 5 of the drawings, and having reference to the bar graph of FIG. 6 which strictly corresponds to the sequence and timing of operation of the different elements of said machine. Therefore, a brief description of the machine of FIGS. 3 to 5 will be presented hereinafter, as an example of application of the electronic control system of the present invention.

A typical machine generally comprises four unitary forming sections designated by the reference characters A, B, C and D in FIG. 3 of the drawings. Said sections are arranged around a central tower 101 and each is associated with a pair of scoops such as 102 which are operated by means of a bracket 103 connected to a suitable fluid operated linear motor 104 to place each pair of scoops under the opening of a common glass gob feeding and distributing means. Wherein the glass gobs are cut and released by means of a shear (not shown) which is very well known in the art.

The four sections of the machine illustrated in FIG. 3, are operated in sequences arranged within the duration of a total cycle of operation and as each one of the unitary forming sections effects exactly the same sequence of operations, only one of such sections will be described in what follows, having more particular reference to FIGS. 4 and 5 of the drawings.

Each unitary forming section of the glassware forming machine illustrated in FIGS. 3, 4 and 5, comprises a glass gob feeder assembly having a pair of scoops 102, a pair of guiding channels 118 and a pair of discharge channels 130; a pressing piston assembly 105 which contains a pair of pressing pistons 107 is actuated by a pressure compensating device generally designated by reference character 106, whereby the pistons such as 107 are capable of working into respective blank molds 110 containing a glass gob previously fed thereinto, which blank molds 110 are supported by means of a levelling assembly 109 actuated by a mechanism 108 to move said blank molds 110 into an out of molding position by firstly lowering and oscillating said blank molds to thereafter back oscillating and raising the same into molding position. All of these operating elements are generally arranged to work in a so called blank molding station, which comprises the space between the central tower 101 and a shaft 111.

Each forming section of the glassware forming machine also comprises a shaft 111 around which a neck ring supporting turret 112 is loosely engaged to be rotated by the drive system of the machine, said neck ring supporting turret 112 containing a plurality of neck rings such as 112 which in the particular case of the machine illustrated in FIGS. 3 to 5 are rotating neck rings and, underneath said turret 112, there is arranged a set of blow mold holder arms 113 engaged to respective concentric rotary shafts mounted on the central shaft 111. The mold holder assembly 113 supports a plurality of split blow molds such as 114, and the housing generally indicated by reference character 115 is provided for preserving the drive gears and cams of the machine properly lubricated.

The blow molds 114, complete their molding action when placed in a so called take out station, which comprises the space between the shaft 111 and the take away conveyor 117. Within said take out station, a take out mechanism 116 removes the finished ware from the corresponding neck rings 112 upon the split blow molds 114 and the neck rings 122 having been opened, and a belt conveyor 117 carries said finished ware away from the machine.

The turret 112 is fixed in any one of two diametrically opposite positions by means of a retractable key or latch 119 which moves into and out of a pair of vertical grooves 181 and 182 (FIG. 5) provided in a pair of slide plates 120 and 121, one at each end of said turret 112, in order to fix the position thereof when each of the arms (X and Z) of the turret 112 is rotated to the blank molding station.

An air blowing system generally illustrated by means of reference character 123 is also provided to blow air under relatively low pressure into the blow molds 114 in order to blow the parisons formed at the blank molding station in the blank molds 110 and to complete the blowing of the finished articles contained in the blow molds 114.

The mechanism for operating the blow molds of the machine to which the electronic control system of the present invention is applicable, comprises a pair of blow mold holder arms 124 and 125, as more clearly illustrated in FIG. 5 of the drawings. The blow mold holder arm 124 comprises a pair of concave blow mold halves supporting cavities 126 and 128, directed towards circumferentially opposite directions, in order for each of said concave cavities 126 and 128 to hold one or more blow mold halves that are closable through rotation of said arm (as will be described hereinafter) at the blank molding station. Similarly, the blow mold holder arm 125 comprises two respective concave cavities 127 and 129 for carrying the blow mold halves, and it will be seen that the movement of said blow mold holder arms is capable of alternately closing the cavity 126 against the cavity 127 by abutting the ends 131 and 132 of said cavities, respectively, or it may close the cavities 128 and 129 by abutting the ends 133 and 134 thereof, in the opposite position to that shown in FIG. 5 of the drawings.

The guiding channels 118 and 130 that have been separately illustrated in FIG. 4 for purposes of clarity (as indicated by the dotted line arrow) are operated into and out of operative position jointly with the piston assembly 105, by means of an oscillating bracket 141 (FIG. 5) which is actuated by a fluid linear motor 142 in order to sequentially displace both the channels 118, 130 and the piston assembly 105 into and out of their respective operative positions, because both operating mechanisms of the machine are engaged to said bracket 141 to be actuated simultaneously, that is, when the channels are in position, then the piston assembly is displaced out of position and vice versa.

Each section of the machine illustrated in FIGS. 3 to 5, which corresponds to a paste mold machine, comprises a set of showers such as 143, to spray a cooling liquid or humidifying liquid into the blow mold halves, for which purpose said showers, at least in a certain position of said blow mold halves, are placed directly above the same in order to permit them to receive a sufficient spray of cooling or humidifying fluid.

The operation of the illustrative machine depicted in FIGS. 3, 4 and 5, controlled by means of the electronic timing control system of the present invention, will be described in what follows by having reference to the bar graph of FIG. 6 in relation to the table of settings or timetable that will be set forth hereinafter.

The starting position of the machine in order to commence its first cycle of operation is controlled by the initial position button and pressing of the latter will automatically place the mechanism in the position shown in section B of FIGS. 4 and 5, namely: The mold holder arms 124 and 125 are closed at the take out station under the arm Z of turret 112; the scoops 102 are in a glass gob receiving position under the molten glass source (not shown) the channels 118, 130 are also aligned with the scoops 102 directly above the corresponding neck rings 122 of arm X of turret 112; the turret arm X is at the blank molding station; latch 119 is extended into groove 181 of slide plate 120 of arm X of turret 112; the blank molds 110 are in operative position directly under the neck rings 122 of arm X of turret 112; the pressure compensating device 106 of piston assembly 105 is not pressurized and the piston assembly 105 itself is out of operative position.

When the shear of the glass gob feeding and distribution means cuts a glass gob, the glass gob release sensor SCG sends a signal to the controller to start a cycle of operation of the machine. If a glass gob is not released, then the controller does not receive the SCG signal and lights a lamp at the operator panel to warm him that something went wrong at the glass gob feeding and distribution means, and inhibits the actuation of all the mechanisms, but the operation of the machine may be continued with simulated times to replace the absence of signals from the sensor. If on the contrary, a glass gob is released, then normal operation of the machine is triggered by the signal SCG.

When starting from an initial position as described above, the SCG signal triggers operation of the pressure compensating device of the piston mechanism 105 (bar TCP of FIG. 6) to create the necessary pressure to press the glass gob in due course. The signal SCG also triggers the real time clock and the control for the duration of the gob fall (bar TPG). When the released glass gob reaches the gap 55 (FIG. 4) the temperature sensor ST sends a signal to the controller, which triggers operation of the piston mechanism 105, whereby the linear motor 142 operates the bracket 141 and the latter simultaneously rotates the channels 118, 130 out of feeding position (bar TVC) and the piston assembly 105 to place pistons 107 directly above the neck rings 122 of arm X of turret 112 (bar TBP).

The rotation of the piston assembly 105 is effected by means of the linear motor 142 and bracket 141, which rotate the piston assembly 105 about the shaft 150 (line TEP). Thereafter, the piston assembly 105 is pushed down (line TPB) so that the pistons 107 enter into the blank molds 110, by means of the linear motor 165 which pushes the pressure compensating device 106 downwardly through the rod 166 (FIG. 4). As soon as the tips of the pistons 107 touch the surface of the glass gob (bar TIP), the pressure sensor SP sends a signal to the controller, whereby the accurately measured pressing operation of the glass gob commences (bar TPX).

The timer system of the present invention thereafter controls the pressing operation to stop after a predetermined and accurate time and then the piston assembly is raised by effecting the reverse movements (lines TPSU/TPSA). Somewhat later, the blank mold assembly is lowered and rotated in order to remove it from the blank molding station (lines TBB/TOBPS) by means of the mechanism that will be described hereinafter in connection with the opposite movement of the blank molds, leaving the parison hanging from the neck rings 122, so that the blank molding station is cleared to receive the blow mold holder arms 124 and 125. At this time, the closed blow mold holder arms 124 and 125 which are now with the split blow molds 114 closed at the arm Z of turret 112 in the take out station, are opened and the mold halves in cavity 128, 129 are closed at arm X of turret 112 by rotation in opposite directions around their respective shafts 148 and 149 (FIG. 5) which are actuated by means of the fluid linear motors 170 and move the said blow mold holder arms through the intermediate of the hubs 146 and 147, respectively (bar TMXA). This rotation of the mold holder arms 124 and 125 closes the cavities 128 and 129 thereof around the already formed parisons and as soon as the blow molds contained in said cavities are closed, the corresponding neck rings 122 of arm X of turret 112 commence rotation (bar TGCX).

The blow mold holder arms 124 and 125 contain a set of jacks 144 and 145, which trap the edges of the turret 112 in order to form a unitary assembly for purposes which will be described hereinafter. In other words, when the cavities 128 and 129 of the blow mold holder arms 124 and 125 close around the parisons under the arm X of the turret 112, the jacks 144 and 145 are placed such that they form a single unit with the arm X of the turret.

The blowing operation which is effected by means of the blowing system 123 through the blowing heads 151, is commenced by a mechanical valve and a weak blow signal (bar TPS), that is, by a push valve (not shown) that operates when the blow mold holder arms are closed, in order to direct a stream of air to effect the first blow into the blow molds which are now at the blank-molding station, while the neck rings 122 supporting the parisons are rotated (bar TGCX) by means of the corresponding rotating fluid motor 152 (FIGS. 4 and 5). Immediately thereafter, latch 119 is retracted (bar TCS) to release groove 181 of the slide plate 120 and the assembly formed by the turret 112 trapped between the jacks 144 and 145 of the corresponding mold holder arms 124 and 125 is rotated as a unit (bar TGT) by means of one of the fluid linear motors 170, in order to displace the arm X of the turret to the take out station, while the arm Z of said turret is placed now at the blank molding station.

As soon as this rotation is completed, the latch 119 is extended (bar TCE) into the groove 182 of the slide plate 121 of arm Z of turret 112, in order to fix the position of the turret.

Sometime before the turret completes rotation, the scoops 102 and channels 118, 130 are placed in position (bar TVC) through rotation of the assembly around shaft 150, by means of the oscillating bracket 141 and linear motor 142 described above, and the molds are again placed in position (lines TOBE/TBS) to commence a new cycle, but now on the arm Z of turret 112, which operation is effected as follows: Firstly the scoops 102 and channels 118, 130 are rotated by means of the corresponding mechanism formed by the oscillating bracket 141 and the linear motor 142, about the shaft 150 in order to place them in feeding position, as shown in section B of FIG. 5 (bar TVC of FIG. 6). The blank molds 110 are rotated by means of a corresponding linear motor (not shown) around shaft 161 whereby the lower bracket 108 rotates the linear motor 162 and the blank mold assembly 110 along the curved wells 163 (line TOBE). Thereafter, the linear motor 162 pushes the rod 164 upwardly and correspondingly the blank molds 110 are placed in its molding position under the neck rings 122 supported by the arm Z of turret 112 (line TBS).

When the glass gob releasing sensor SCG sends the corresponding signal to complete the first cycle and commence the second cycle, the shower for the blow mold halves which are now at the Z arm of the turret 112 are opened in order to cool and humidify said blow mold halves (bar TOFFXZ).

The machine illustrated in these figures and controlled by the control system of the present invention may incorporate two blowing operations, a first blowing operation at a relatively higher pressure than a second blowing operation, for which purpose the signal for the second blow operation is sent to the blowing device by means of the controller of the present invention, in order to commence said second blowing operation a small time before the turret completes its rotation, (bar TSS), so that the ware may be properly finished when at the take out station. After the second blow is finished, the neck rings 122 cease to be rotated by their motors 152 and a signal is sent to open the neck rings (bars TACX/TACZ) and release the finished ware. At this time, the take out mechanism 116 enters and is raised (bar TSAE-TSASU) in order to receive the finished ware on the surface of its plate 175 which thereafter is again lowered and rotated (bars TSASA-TSAB) in order to deliver the finished ware to the conveyor 117 which takes the finished ware out of the machine.

The above description of the cycle may be more fully understood by having reference to the following particular table of settings, which was prepared for fixing the timing and the duration of the different operations for a particular small glass article and working on a cycle having a total duration of 7 seconds, which expressed in hundredths of a second, is a cycle of 700 time units.

The electronic control system of the present invention, as mentioned above, comprises a real time clock which has been fixed to count hundredths of a second, and the duration of the cycle is not given in degrees but rather in real times, whereby the following table of settings contains in its first column the number corresponding to the display exhibited by the operator panel 6 of the control system of the present invention; the second column of said table of settings contains the serial numbers corresponding to the seven digital switches provided on the operator panel 6 as described above; the third column contains the codes utilized in the bar graph of FIG. 6 and in the foregoing description to identify the nature of the operation to be performed; the fourth column contains a brief description of the operation performed; and the fifth and last column contains the digits that are selected on the digital switches in order to enter the timings of the different elements of the machine expressed as units of time corresponding to hundredths of a second.

TABLE OF SETTINGS

| | | | 700 TIME UNITS CYCLE | |
|---|---|---|---|---|
| SCG | 0 | | Initiation of a cycle | 0 |
| | 1 | TOBE | Blank Mold Oscillator in | −25 |
| | 2 | TBS | Bland Mold up | 35 |
| | 3 | TPB | Piston Down | 40 |
| | 4 | TACZ | Neck Ring Z opens | 15 |
| I. | 5 | TACX | Neck Ring X opens | 13 |
| | 6 | TGCZ | Neck Ring Z rotates | 15 |
| | 7 | TBB | Blank Mold down | 10 |
| SP | 1 | TIP | Pressing Operation commences | 200 |
| ST | 2 | TPG | Glass Gob into Blank Mold | 100 |
| | 3 | TOBPS | Blank Mold/Piston Oscillator | 70 |
| | 4 | TVC | Scoops and Channels in | −55 |
| II. | 5 | TOFFXZ | Showers X and Z out | 280 |
| | 6 | TGCX | Neck Ring X rotates | 18 |
| | 7 | TSAE | Take Out Mechanism in | 8 |
| | 1 | TSASA | Take Out Mechanism out | 70 |
| | 2 | TSASU | Take Out Mechanism up | 35 |
| | 3 | TSAB | Take Out Mechanism down | 180 |
| III. | 4 | TCE | Turret Latch extends | SCG |
| | 5 | TCS | Turret Latch retracts | TOBPS(end |
| | 6 | TCP | Pressure Compensator in | SCG |
| | 7 | TBE | Blank Mold cools | 30 |
| | 1 | TPZ | Pressing Operation Z | 100 |
| | 2 | TS | Stretch | 150 |
| | 3 | TPX | Pressing Operation X | 110 |
| | 4 | TGT | Turret rotates | −100 |
| | 5 | TMZA | Mold Z closes (related to stretch) | 50% |
| | 6 | TMXA | Mold X closes (related to stretch) | 35% |
| | 7 | TSS | Second Blow starts | 75 |

It will be noted that the times stated on the lines II-1 and II-2 (TIP and TPG) are only entered in this table of settings to simulate the real times given by the corresponding pressure and temperature sensors, respectively, to serve for unload operation for testing the table of settings prior to starting the machine with a load of glass.

The times represented by lines TPE (piston in) and TPSA (piston out) do not appear in the above table of settings, because the piston assembly is mechanically tied to the guiding channels actuator (bar TVC). The time TPSU (piston up), in turn, is tied to the end of the pressing operation TPX or TPZ.

Also, it will be noted that the time represented by the bar marked TPS in FIG. 6 of the drawings, does not appear in this table of settings, because as mentioned above, this bar, corresponding to the first blowing operation, is tied to the "neck ring rotates" signal (bar TGCX/TGCZ) sent to the machine by the electronic control system of the present invention, whereas at the same time the first blow is properly directed by means of the mechanical opening of a valve, which is actuated by the closing of the blow mold holder arms against each of the arms of the turret, this valve being a push valve which is actuated by the edges of the turret to direct the first blow towards the appropriate molds when the blow molds have been closed at the blank forming station as already described above. The end of this operation is given by the controller signal to commence the second blow.

The procedure followed by the operator in order to control the manufacture of glassware by means of a machine as the one illustrated in FIGS. 3 to 5 of the drawings will be exemplarily disclosed as follows:

Firstly the operator sequentially enters, through the seven digital switches provided on panel 6, all the digits corresponding to the time values of his table of settings, which has been previously prepared for a predetermined article by experiment or otherwise. When completing the first seven numbers or times to be fed to the controller 1, the operator presses the button for readout and feeds and stores this information in the controller 1. The display then shows the digit 1 advising the operator that the first set of times has been fed to the machine and accepted. The operation is repeated by lighting three more times the display, until the total number of times have been fed to the controller.

Therefore, the operator pushes the initial position button whereby all the mechanisms of the machine are placed in the programmed start or initial position shown in FIGS. 4 and 5 of the drawings. Then he presses the start button and the unload test button, and the machine will simulate the operation with the times provided by the oscillator and by the table of settings, whereby the operator may check if the times fed to the machine are correct or if some changes must be made. For this purpose, the machine is worked over two consecutive cycles triggered by the oscillator in order for the controller to calculate the time of the cycle and enter it into its memory for use in automatic operation. However, if the times entered by the operator do not match the equation in the memory of the controller, the latter rejects such times before any operation is effected and advises the operator accordingly. During the unload test operation, the sensors are not at work and, therefore, the times normally given by the gob release sensor are simulated by means of the oscillator contained in panel 6 which triggers the initiation of a cycle as described above.

Once the operator has checked that all the times fed to the machine are correct, after resetting all the mechanisms, he may press the start button for operating the machine with a glass load, whereby said machine will be automatically controlled by the electronic timing control system of the present invention to which the times of the table of setting were previously fed and kept in memory.

However, during the normal or loaded operation, the oscillator is not at work and instead the times are taken from the sensor signals, whereby to obtain the advantages that have been previously described of starting the pressing operation at the proper time, by triggering the commencement of a new cycle by means of the glass gob release sensor SCG, by triggering the operation of the pistons by means of the temperature sensor ST and thereafter by triggering the timing and the duration of the pressing operation which is controlled by the real time clock, but measuring the time accurately when the pressure sensor SP determines that the pressing operation has actually commenced.

The graph of FIG. 6 is self understandable and illustrates two consecutive cyles, one in which the arm X of the turret 112 is at the blank molding station and the second one wherein the turret has rotated to have its arm Z at the blank molding station. The operations are identified in this graph by the same reference characters which identify the different operations in the above exemplary table of settings and above performance description, whereby no further explanation appears to be necessary.

It will be seen that from the above that a fully automatic electronic timing control system for glassware forming machines has been provided that, in view of the incorporation of a real time clock, does not depend on a counter (which may count degrees or fractions of degrees) for fixing the timing and duration of the operations of said glassware forming machine, and which, by means of the inclusion of at least three sensors that determine the actual times of execution of the most critical events in a glassware forming operation, enable the handling of both absolute and relative variables at the will of the operator, and secures the duration and timing required for the most critical absolute variables, such as the duration of the parison forming operation, as well as the commencement of said operation after the glass gob has been deposited in the blank mold, in order to prevent the disadvantages which were very frequent with the control systems of the prior art, such as the settle-wave phenomenon and the production of defective ware in view of a bad parison formation. The provision of the sensors in accordance with the present invention, render it possible to secure commencement of the parison forming operation and the duration thereof in an accurate manner that was unobtainable with any of the electronic systems of the prior art and also with any of the mechanical systems of the prior art.

Also, the system of the present invention, which works exclusively on real times, calculates and determines the cycles by the provision of one single signal obtained from the glass gob release sensor and is perfectly capable of warning the operator of a malfunction of the scoops and guiding channels as well as of the initiation of the parison forming operation by providing two additional sensor signals that feedback the real times taken by the real operations into the control.

Although in the above specification certain specific embodiments of the present invention have been shown and described, it is to be understood that many modifications thereof are possible. The present invention, therefore, is not to be restricted except insofar as is necessitated by the prior art and by the spirit of the appended claims.

What is claimed is:

1. An electronic control system for glassware or other thermoplastic articles forming machines of the kind having at least one unitary forming section comprising glass gob feeding and distribution means; glass gob guiding channel means for guiding said gobs from said feeding and distribution means; a blank forming station having blank mold means to receive glass gobs from said guiding channel means and parison formimg means to cooperate with said blank mold means to form a parison; a blow molding station and/or a take out station having closeable split blow mold means, transfer means for transferring said formed parisons from said blank forming station, blowing means for injecting a stream of air into said parisons and blow the same to form finished ware, and take out means for removing said finished ware from the machine; said electronic timing control system comprising preprogrammed controller means capable of sequentially controlling all the ware forming operations of said machine, and having a fixed memory to store the sequence of operations and the timing of fixed variables of said sequence and a floating memory to store the timing of certain other variables of said sequence; constant frequency pulse generator means to act as a real time clock to measure the timing and duration of each operation sequentially controlled by said controller means in real times; glass gob release sensor means to detect the instant when a glass gob is cut and released from said glass gob feeding and distribution means and feedback a signal to said controller means for triggering the initiation of a ware forming cycle of the machine; temperature sensor means to detect the passage of a glass gob from said guiding channel means to said blank mold means and feedback a signal to said controller means for timely controlling the removal of said guiding channel means and the introduction and initiation of the operation of said parison forming means in intimate relationship with actual arrival of a glass gob into said blank mold means; pressure sensor means to detect the instant when said parison forming means commence to work on a glass gob and feedback a signal to said controller means for triggering the time count of the remaining ware forming operations; and operator panel means having digital switch means for feeding a timetable subprogram to said floating memory, variable frequency oscillator means for simulating the feedback signal from said glass gob release sensor means when said feedback signal is absent, and mode of operation selector switch means for selecting a mode of operation from at least manual operation of the main mechanisms of the machine, test operation without a glass load in the machine, and automatic operation with a glass load in the machine.

2. An electronic control system according to claim 1 wherein said parison forming means are pressing piston means and said pressure sensor means detect the instant when said piston means touch the surface of said gob within said blank mold means, whereby to send a feedback signal to the controller means to trigger the initiation of the pressing operation and thus provide an accurate duration thereof in real times measured by said constant frequency pulse generator.

3. An electronic control system according to claim 1 wherein said parison forming means are glass gob settle-blow and counter-blow means and said pressure sensor means detect the instant when said settle-blow means complete operation in said blank mold means and said counterblow is initiated, whereby to send a feedback signal to the controller means precisely upon initiation of the counterblow operation to thus provide an accurate duration thereof in real times measured by said constant frequency pulse generator.

4. An electronic control system according to claim 1 wherein automatic inhibiting means are included to inhibit operation of said parison forming means in the absence of a feedback signal from said temperature sensor means, said inhibiting means permitting the operation of the remaining stages of the ware forming cycle.

5. An electronic control system according to claim 1 wherein said operator panel means includes alarm means to warn the operator when anyone of said feedback signals from the sensor means is absent, whereby to permit the operator to take corrective action.

6. An electronic control system according to claim 5 wherein said alarm means warns the operator of the absence of a feedback signal from said glass gob release sensor means, and also triggers the inhibition of all the operations of said ware forming cycle.

7. An electronic control system according to claim 6 wherein said temperature sensor means feedback a signal which triggers the removal of said guiding channel means and the initiation of said parison forming means and wherein the alarm means also warn the operator of the absence of a feedback signal from said temperature sensor means and are triggered only after a predetermined proportion of a time allowance within the ware forming cycle has been consumed, in order to compensate for a permissible delay in the glass gob fall from said feeding and distribution means to said blank mold means due to lack of lubrication of said channel means.

8. An electronic control system according to claim 6 wherein said guiding channel means are controlledly lubricated by a lubricating system responsive to signals from said controller means whereby to provide for a substantially constant time of fall of said glass gob, removal of said guiding channel means and operation of said parison forming means being triggered by said controller means prior to the back feeding of said temperature sensor means feedback signal, and the latter serving to detect the time differential between the triggering of said parison forming means and the actual fall of the glass gob detected by said temperature sensor means whereby to trigger the alarm means when the time differential becomes larger than a predetermined time value.

9. An electronic control system according to claim 7 wherein the absence of a feedback signal from said pressure sensor means triggers the corresponding alarm means only after a predetermined further proportion of said time allowance within the ware forming cycle has been consumed, in order to compensate for permissible delays in the prior operations, said alarm means not being able to inhibit any one of the mechanisms of the machine.

10. An electronic control system according to claim 1 wherein said mode of operation selector switch means for selecting manual operation, when actuated, disconnect said fixed memory and said floating memory of said controller means and comprise a circuitry including two digital switches selected from said digital switch means, one of said digital switches actuating a mechanism selector circuit and the other one of said digital switches being a timing switch to feed a time signal to the controller to fix the duration of operation of the selected mechanism, said duration being fixed on a considerably slower scale as compared to the duration of said operation on automatic operation of the machine, whereby to permit ocular inspection of the operation of the manually selected mechanism.

11. An electronic control system according to claim 1 wherein said mode of operation selector switch means for selecting test operation without a glass load in the machine, when actuated, disconnect said sensor means and connect said variable frequency oscillator means to simulate the feedback signal from the glass gob release sensor means and initiate the ware forming cycle, and comprise a reclaiming circuit to reclaim from said floating memory the times contained in the timetable subprogram to simulate the feedback signals from said temperature sensor means and said pressure sensor means whereby to sequentially and timely carry out the operations of the full ware forming cycle without the use of said feedback signals.

12. An electronic control system according to claim 1 wherein said digital switch means for feeding a timetable subprogram to the floating memory of said controller means include display means to exhibit the time signals marked by a plurality of digital switches, memory readout means to feed said time signals into said floating memory and reset said display means, and group selecting means to enable reuse of said digital switches for marking additional time signals to be exhibited by said display means and fed to said memory of the controller means.

13. An electronic control system according to claim 1 wherein said mode of operation selector switch means comprise emergency stop switch means to inhibit any remaining portion of the ware forming cycle and to immediately stop the machine when actuated.

14. An electronic control system according to claim 13 wherein said mode of operation selector switch means comprise preprogrammed stop switch means to carry out any remaining portion of the ware forming cycle when actuated and to thereafter stop the machine in a reset or starting condition.

15. An electronic control system according to claim 11 wherein timetable subprogram reject means are included to immediately inhibit operation of any mechanism of the machine, said reject means comprising a comparator circuit to detect when a predetermined timetable subprogram fed to said floating memory does not match with the cycle sequence stored in said fixed memory, and alarm means to warn the operator of said fact.

* * * * *